United States Patent [19]
Denninghoff et al.

[11] Patent Number: 5,724,070
[45] Date of Patent: Mar. 3, 1998

[54] COMMON DIGITAL REPRESENTATION OF STILL IMAGES FOR DATA TRANSFER WITH BOTH SLOW AND FAST DATA TRANSFER RATES

[75] Inventors: Karl Denninghoff; Chandan S. Chauhan; Philippe Ferriere, all of Redmond, Wash.

[73] Assignee: Microsoft Corporation, Redmond, Wash.

[21] Appl. No.: 560,907

[22] Filed: Nov. 20, 1995

[51] Int. Cl.⁶ ............................................. G09G 5/00
[52] U.S. Cl. .................... 345/202; 382/233; 382/235; 382/255; 382/299; 395/114; 348/24
[58] Field of Search ........................... 345/202; 382/233, 382/235, 254, 255, 299, 232; 395/114, 128; 348/24

[56] References Cited

U.S. PATENT DOCUMENTS

| | | |
|---|---|---|
| 5,369,441 | 11/1994 | Enari ............................. 348/24 X |
| 5,398,066 | 3/1995 | Martinez-Uriegas et al. ........... 348/393 |
| 5,541,653 | 7/1996 | Peters et al. ....................... 348/264 |
| 5,546,477 | 8/1996 | Knowles et al. ..................... 382/242 |
| 5,559,936 | 9/1996 | Poulter et al. ...................... 395/128 |
| 5,563,633 | 10/1996 | Parsons ............................... 345/202 |
| 5,594,503 | 1/1997 | Miyazawa ............................. 348/414 |
| 5,615,287 | 3/1997 | Fu et al. ............................. 382/232 |

OTHER PUBLICATIONS

Gregory K. Wallace, The JPEG Still Picture Compression Standard, IEEE Transactions on Consumer Electronics, vol. 38, No. 1, Feb. 1992.

C. B. Ahn, I. Y. Kim, and S. W. Han, Medical Image Compression using JPEG Progressive Coding, Nuclear Science Symposium and Medical Imaging Conference, 1993.

*Primary Examiner*—Raymond J. Bayerl
*Assistant Examiner*—Seth D. Vail
*Attorney, Agent, or Firm*—Lee & Hayes, PLLC

[57] ABSTRACT

A computer system includes a local non-volatile data storage medium and a visual display device. A still image is stored as a compressed data file in a multi-resolution compression format on the non-volatile data storage medium. The multi-resolution format is of a type that allows efficient progressive decompression and display of the selected still image. The computer system includes a data processor programmed to decompress the compressed data file, to produce successive versions of the selected still image at progressively increasing resolutions, and to display the successive versions on the visual display device. The computer system has a data retrieval medium through which the data processor retrieves the compressed data file from the local non-volatile data storage medium. The data retrieval medium has a data transfer rate that is at least as fast as the data processor can decompress the compressed data file and display the successive versions of the selected still image.

26 Claims, 5 Drawing Sheets

COMMON DIGITAL REPRESENTATION OF STILL IMAGES FOR DATA TRANSFER WITH BOTH SLOW AND FAST DATA TRANSFER RATES

TECHNICAL FIELD

This invention relates to systems and methods for displaying large, digitally-represented still images originating from local sources such as CD-ROMs, floppy disks, and hard disk drives.

BACKGROUND OF THE INVENTION

A great variety of resources are currently available to computer users. Digitally-represented still images are an example of one popular resource. In the computer environment, still images are used for a variety of purposes. For instance, computer-generated images or graphics are used in conjunction with educational software. Digitally-stored photographs or other images are also used for entertainment purposes in many computer applications such as games. Still images are increasingly being used for advertising purposes in conjunction with the Internet or commercial on-line services. In addition, many images are available as independent data files on the Internet and the commercial on-line services.

A typical still image for computer viewing might be represented by a matrix of pixel values having dimensions of 1024×1000 or greater. Each pixel might be represented by up to 24 bits. Thus, a typical image might require 3 Mbytes of data storage. This is a relatively large storage requirement that creates potential difficulties in distributing images to ultimate viewers.

Images are typically distributed using either a remotely-accessed on-line source or a physical distribution media such as a floppy disk, CD-ROM (compact disk read-only memory), or other type of non-volatile storage medium. When distributing an image via an on-line source, large storage requirements result in very large image transmission times. For instance, transmitting a 1024×1000×24 bit image might take over forty minutes using a common modem speed of 9600 baud. Forty minutes exceeds the tolerance of all but the most determined of users.

When distributing images via physical distribution media such as CD-ROMs, large image storage requirements can impose significant limitations on the number of images that can be stored on a single medium. For instance, the capacity of a CD-ROM is currently about 600 Mbytes, sufficient for only about 200 1024×1000×24 still images.

Fortunately, still images can be efficiently compressed using a variety of well known techniques. With such techniques, an uncompressed 3 Mbyte image might be compressed by a factor of 10 or more, to under 300 Kbytes. Transmitting a 1024×1000×24 image in compressed format would take less than five minutes, and perhaps 2000 of such images could be stored on a CD-ROM.

Even with compression, however, transmission times from on-line services can be so great as to frustrate even the most patient consumers of still images. Five minutes, for example, is like an eternity to a computer user who is accustomed to split-second responses. A user's frustration is often increased by the fact that the receiving computer appears to be doing nothing during the entire time the image is being transmitted. Furthermore, a user may find, after investing significant time to download an image, that the image is not what he or she was looking for.

To improve user satisfaction, progressive image transmission and display has been used for transferring still images over relatively slow communications media such as modem-based communications channels. In progressive image transmission and display schemes, information is transferred in such a way that a receiving computer can initially and quickly reconstruct a low-quality or relatively low-resolution version of the ultimate image for the immediate gratification of the user. As more information is transmitted, the receiving computer can display an image at progressively increasing quality or resolution until the final image is displayed. At any time during the transmission, the user can decide that the image is not worth the wait and can abort the transfer.

Progressive image transmission schemes have been found to greatly improve user satisfaction since they give the viewer some idea of the image quickly, while waiting for the full resolution version of the image to be displayed. One particularly efficient form of image storage and progressive image transmission is described in a U.S. Patent Application entitled "Progressive Image Transmission Using Discrete Wavelet Transforms," by inventor Philippe Ferriere (filed Dec. 5, 1994, Ser. No. 08/349,324), which is hereby incorporated by reference.

In the past, the time to display an image from a CD-ROM or a hard disk has been minimal. However, new, higher resolution computer display systems are causing an increase in the size and complexity of images. Thus, the wait while an image is decompressed and displayed has in many cases become an irritation even though data retrieval rates with CD-ROMs and hard disks are relatively fast. To remedy this, efforts have been made to increase the speed of decompression and display utilities. To date, progressive image transmission and display has been used only in situations where data transfer is relatively slow. This is not the case, however, with CD-ROMs and hard disks. Accordingly, it has been believed that the extra decompression steps required in progressive transmission and display schemes are not practical in these environments, where data transfer rates are so great that they are not a limiting factor. In these environments, other compression schemes are used that do not provide for progressive transfer and display of images. It is typical to produce and maintain two or more versions of a still image, one for on-line distribution and the other for distribution via physical media.

SUMMARY OF THE INVENTION

The preferred embodiment of the invention uses progressive display technology even in environments where the speed of image retrieval is not a limiting factor. This is the case, for instance, with CD-ROMs and hard disks. In such environments the use of progressive image display has not previously been considered because of the extra steps involved. In fact, it may be that the time to display a complete image, at full resolution, will be greater using progressive display techniques than with current, non-progressive compression schemes. This fact has apparently lead software designers away from the use of progressive image display when image retrieval speed is relatively fast. User satisfaction, however, will increase even in these environments because of the more immediate gratification available to the user. Also, there is a significant advantage to producers of multi-media software in being able to use the same storage format for images whether they are to be distributed via physical distribution media or via on-line services.

DETAILED DESCRIPTION OF THE PREFERRED EMBODIMENT

Figure 1:
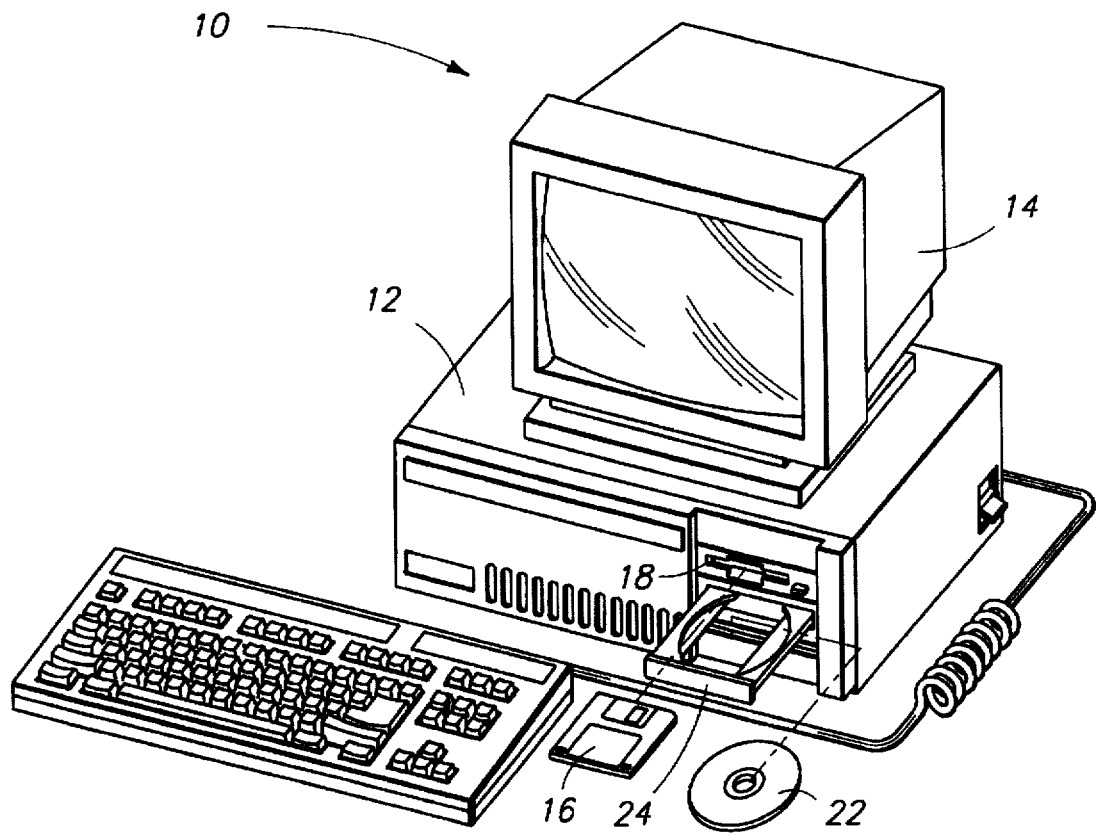
FIG. 1 shows a computer system in accordance with a preferred embodiment of the invention.

FIG. 1 shows a computer system and on-line service in accordance with a preferred embodiment of the invention. The system includes a computer 10 having a data processor 12 and a visual display device 14. The computer is preferably any one of a number of widely available personal or desktop computers. The term "data processor" as used herein is not intended to be limited to a single central processing unit (CPU). Rather, the functions described below can advantageously be performed by computers having two or more CPUs executing in parallel. Visual display device 14 is of a type which displays a matrix of pixels of variable color and intensity to represent one or more images.

Computer 10 includes local, non-volatile, physical storage media. Specifically, computer 10 includes a floppy disk 16 and associated floppy drive unit 18, a hard disk 20, and a CD-ROM 22 and associated CD-ROM drive unit 24. In accordance with the invention, selected still images are stored as compressed data files on one or more of the large physical storage media. These compressed data files are preferably stored in a multi-resolution compression format which allows efficient progressive decompression and display of still images. This means that the files can be progressively decompressed in a manner that provides a number of successive versions of a still image, each at a progressively higher resolution. Ideally, a specific resolution can be obtained with only a fraction of the work required to eventually obtain the highest available resolution, and with no more work than would be required if the specific resolution were the highest available resolution from the data file.

Data processor 12 is programmed, upon the request of a user or an application program executing on computer 10, to retrieve the compressed data file representing an image; to progressively decompress the compressed data file, producing successive versions of the selected still image at progressively increasing resolutions; and to progressively display the successive versions on visual display device 14.

Figure 2:
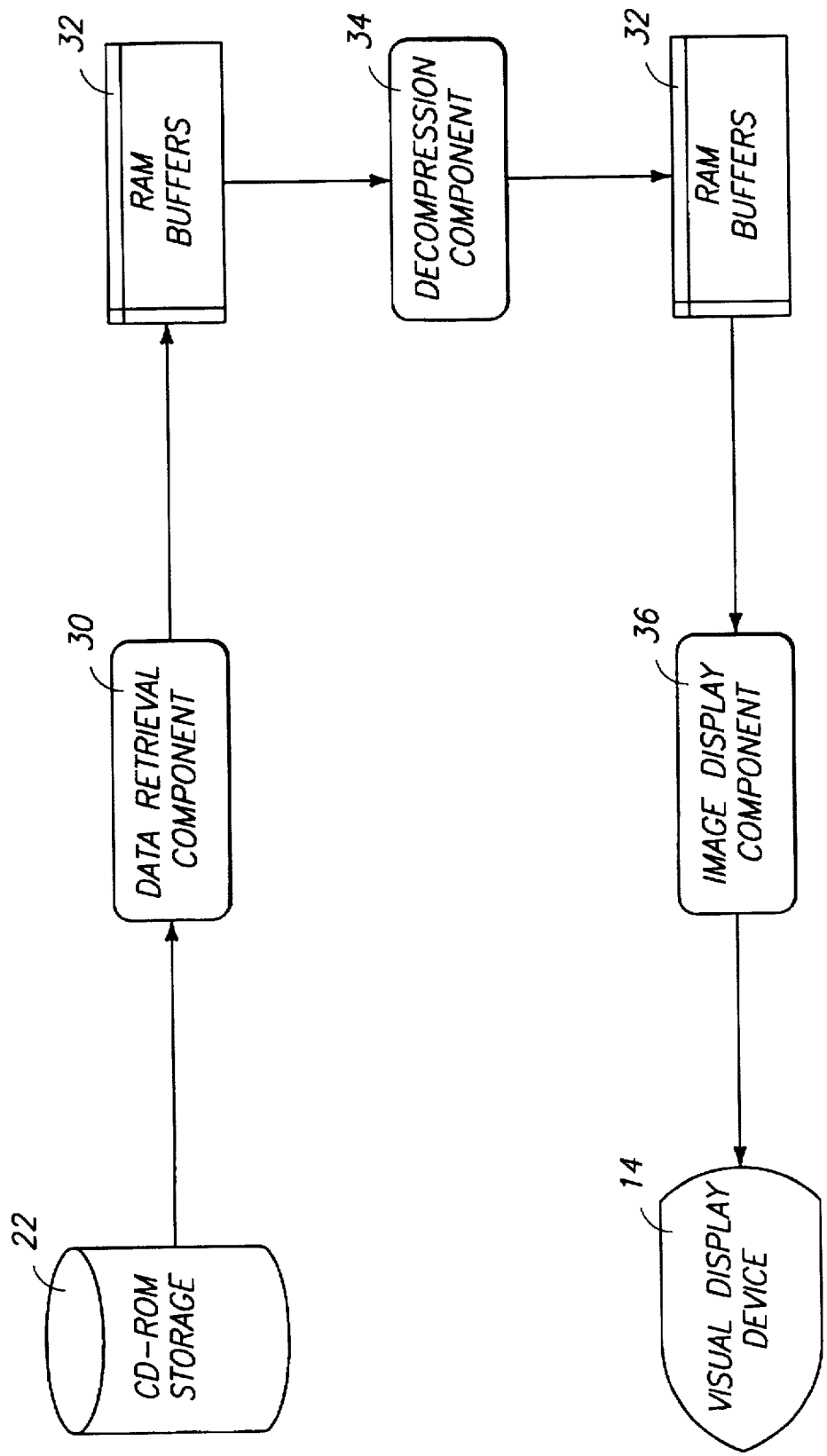
FIG. 2 is a data flow diagram in accordance with the invention.

FIG. 2 shows the data flow described above. In the example shown in FIG. 2, the compressed data file is initially stored on CD-ROM 22. A data retrieval component 30, implemented by data processor 12, retrieves the data file from the CD-ROM and buffers the retrieved data to RAM (random access memory) 32. A decompression component 34, also implemented by data processor 12, takes the data from RAM and decompresses it to produce successive versions of the still image represented by the data file at progressively increasing resolutions. These versions are buffered to RAM 32. An image display component 36, again implemented by data processor 12 in conjunction with video display hardware, is operably connected to display the successive versions of the still image produced by the decompression component on visual display device 14.

Floppy drive unit 18, hard disk 20, and CD-ROM drive unit 24 are accessed through conventional local bus interfaces or interface cards. Such interfaces or cards provide data retrieval media through which data processor 12 retrieves data or files from the physical storage media. These devices are operably connected to supply the compressed data file from the non-volatile data storage medium to decompression component 34 at a data transfer rate which is at least as fast as a decompression rate at which decompression component 34 can decompress the compressed data file. Because of this, the speed at which an image can be retrieved, decompressed, and displayed is not significantly limited by data transfer rates. Rather, the speed of preparing an image for display is limited primarily by the speed of data decompression. Other types of physical storage devices might of course be substituted for those shown, provided that they provide relatively fast data transfer rates which do not limit the rate at which a compressed data file can be prepared for viewing.

This environment, which utilizes relatively fast data retrieval rates, is precisely the environment in which progressive display has not been used in the past. It has been found, however, that significant benefits can be attained by using progressive decompression and/or display even in conjunction with relatively fast data sources such as CD-ROMs and hard disks. For instance, it has become common to limit the size or resolution of images so that they can be displayed more quickly. With the invention, however, this is not necessary. The image can be initially displayed at a low resolution (which can correspond to a small size) and then refined to a higher resolution (and larger size) subject to the patience of the user.

Figure 3:
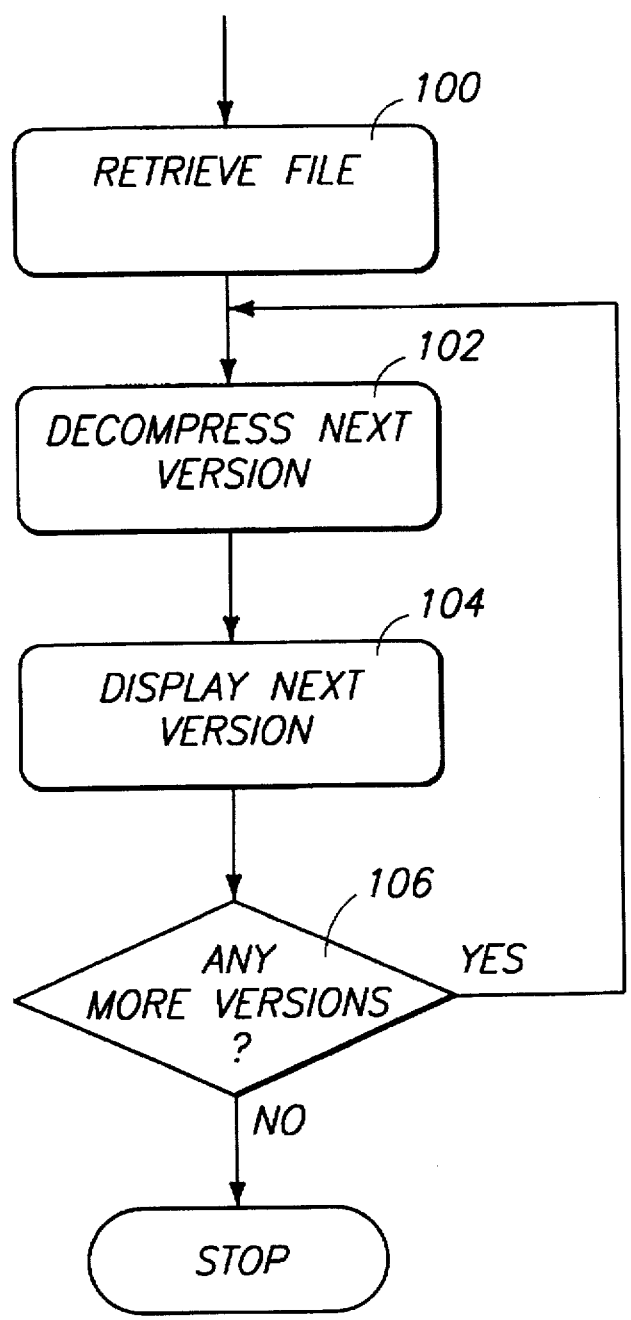
FIGS. 3–5 are flow charts showing preferred methodological steps of the invention.

The invention is not limited to the progressive retrieval of information from fast data sources. Rather, the data file can be retrieved in its entirety before decompression begins. Such a scenario is illustrated in FIG. 3, which shows an initial step 100 of retrieving a compressed data file from a local, non-volatile storage medium. At block 102, data processor 12 decompresses whatever portion of the data file is necessary to produce a version of the still image having a higher resolution than the last version produced. Block 104 shows displaying the still image version resulting from block 102. As indicated by decision block 106, these steps are repeated until the highest-resolution version of the still image has been decompressed and displayed, subject of course to termination of the process by a user. Note that steps 102 and 104 (corresponding to operation of the decompression and display components above, respectively) are performed only after the retrieving step is completed.

Figure 4:
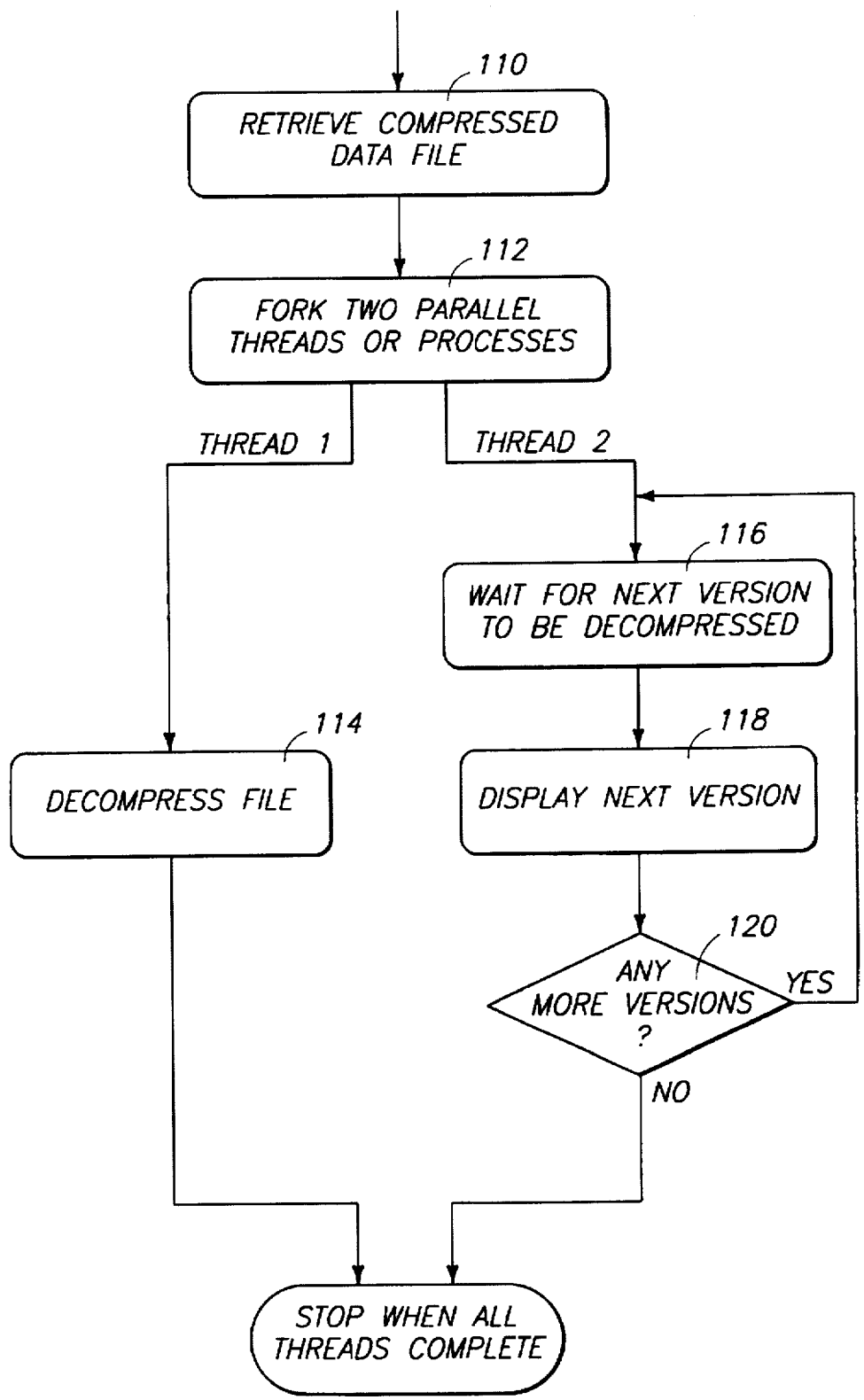

FIG. 4 shows an alternate method of retrieving, decompressing, and displaying a still image, in which retrieval is again performed first, while decompression and display are performed progressively only after the entire image file has been retrieved. In this case, the image display component acts concurrently with the decompression component to display versions of the selected still image while subsequent versions of the image are still being decompressed by the decompression component. Step 110 shows retrieving an entire image data file into RAM buffers. In step 112, two concurrent or parallel threads or processes are initiated for decompression and display, respectively. Decompression is performed in a first execution thread, shown as Thread I, consisting of a decompression step 114. The method of decompression is such that data is made available for display on a progressive basis, so that increasingly higher resolutions of the still image can be displayed.

Although it is not a requirement, it is preferable that the data file be formatted using a multi-resolution compression scheme to facilitate progressive decompression. Even more preferably, the still image is compressed and stored on the non-volatile storage medium using a discrete wavelet transform such as disclosed in the patent application identified above by Ferriere. Using a multi-resolution format is a significant advantage when producing software products that include digitally-represented still images because the same format can be used for both on-line distribution of images as well as for distribution via physical media such as CD-ROMs or floppy disks.

Progressive display is implemented in a second execution thread, shown as Thread II, comprising steps 116, 118, and 120. Step 116 comprises waiting for that data from step 114 which represents the next version of the still image. Step 118 comprises displaying the next version on the visual display device. Decision block 120 indicates that steps 116 and 118 are repeated until the highest resolution is reached.

Figure 5:
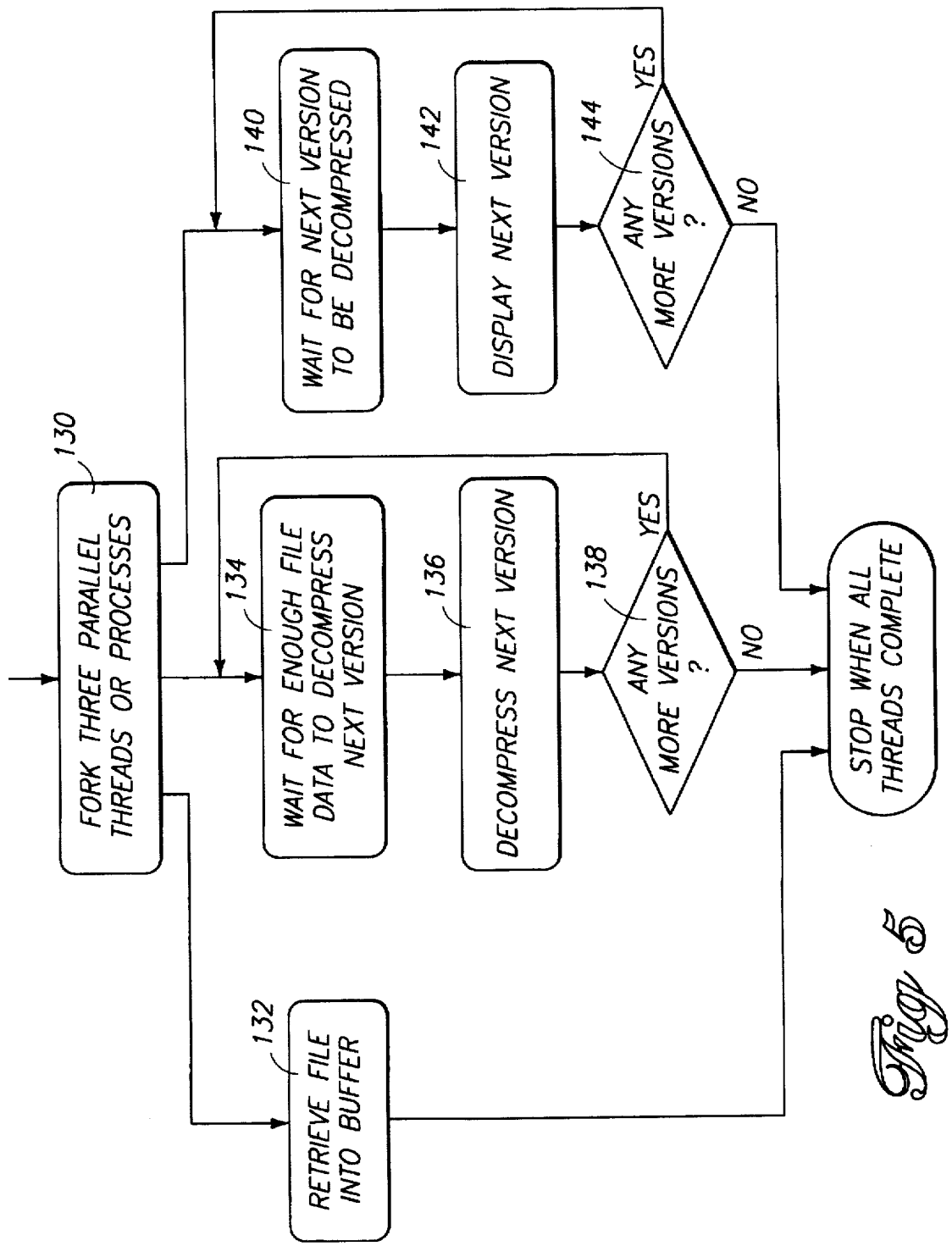

It is also possible to perform retrieval, decompression, and display steps concurrently or simultaneously, as shown in FIG. 5. In this case, the process begins at block 130 by initiating three parallel or concurrent execution threads or processes. A first thread, referred to in FIG. 4 as Thread I, comprises a step 132 of retrieving a compressed data file into a RAM buffer. A second thread, Thread II, comprises steps 134, 136, and 138 of decompressing the data file to produce successive versions of the still image at progressively increasing resolutions. Step 134 comprises waiting on Thread I for enough data to be retrieved to decompress the first (or next) version of the still image represented by the data file. For this scheme to be practical, the data file should be compressed in an appropriate multi-resolution compression format which allows progressive retrieval of the image. Step 136 comprises decompressing the next resolution of the still image after the data for the version becomes available from Thread I. As indicated by decision block 138, steps 134 and 136 are repeated as long as any further versions of the still image remain to be decompressed.

A Thread III comprises steps 140, 142, and 144 of displaying the successive versions of the still image as they become available from Thread II. Step 140 comprises waiting on Thread II for the next version of the still image to be decompressed. Step 142 comprises actually displaying or updating the display of the still image with the newest version from Thread II. As shown by decision block 124, steps 140 and 124 are repeated as long as any further versions of the still image remain to be decompressed.

The invention further includes a production method for preparation and storage of digitally-represented still images for subsequent distribution via different types of distribution media. Such distribution media might include slow media having relatively slow data transfer rates that significantly limit the speed at which an image can be displayed for viewing, such as remotely-accessed on-line services accessed by telephone modem. Such distribution media might also include fast physical distribution media having relatively fast data transfer rates that do not significantly limit the speed at which an image can be prepared and displayed for viewing, such as CD-ROMs, floppy disks, or hard disks accessed through local bus or network interfaces.

Preferred production methods include preparing a single compressed data representation of each digitally-represented still image in a multi-resolution compression format. The preferred methodological steps further include storing a still image on both slow distribution media and fast distribution media using the same single compressed data representation, thereby eliminating the need for preparing more than one data representation for each different type of distribution media. The invention further includes a step of distributing the single compressed data representations via both the slow distribution media and the fast distribution media. As a result of these methods, production costs of software products containing still images can be greatly reduced. Furthermore, an image viewing program executing on a computer can use a common progressive decompression and display scheme to display a retrieved still image regardless of the source of the image.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A still image display system for displaying a still image stored as a compressed data file, comprising:
   a progressive decompression component which decompresses the compressed data file and produces successive versions of the still image at progressively increasing resolutions;
   a data retrieval medium operably connected to supply the compressed data file to the decompression component at a rate which is at least as fast as the decompression component can decompress the compressed data file;
   a visual display device;
   an image display component operably connected to successively display the successive versions of the still image produced by the decompression component on the visual display device;
   wherein the decompression component acts concurrently with the data retrieval medium to decompress the compressed data file concurrently with retrieving the compressed data file.

2. A still image display system as recited in claim 1 wherein the decompression component acts subsequent to the data retrieval medium to decompress the compressed data file after retrieving the compressed data file.

3. A still image display system as recited in claim 1 wherein the image display component acts concurrently with the decompression component to display versions of the still image while subsequent versions of the selected still image are still being decompressed by the decompression component.

4. A still image display system comprising:
   a non-volatile data storage medium;
   a selected still image stored as a compressed data file on the non-volatile data storage medium;
   a progressive decompression component which decompresses the compressed data file and produces successive versions of the selected still image at progressively increasing resolutions;
   a data retrieval medium operably connected to supply the compressed data file from the non-volatile data storage medium to the decompression component at a rate which is at least as fast as the decompression component can decompress the compressed data file;
   a visual display device;
   an image display component operably connected to successively display the successive versions of the selected still image produced by the decompression component on the visual display device;
   wherein the decompression component acts concurrently with the data retrieval medium to decompress the compressed data file concurrently with retrieving the compressed data file from the non-volatile data storage medium.

5. A still image display system as recited in claim 4 wherein the compressed data file is stored on the non-volatile data storage medium in a multi-resolution compression format using a discrete wavelet transform.

6. A still image display system as recited in claim 4 wherein the compressed data file is stored on the non-volatile data storage medium in a multi-resolution compression format which allows efficient progressive decompression and display of the selected still image.

7. A still image display system as recited in claim 4 wherein the decompression component acts subsequent to the data retrieval medium to decompress the compressed data file after retrieving the compressed data file from the non-volatile data storage medium.

8. A still image display system as recited in claim 4 wherein the image display component acts concurrently with the decompression component to display versions of the selected still image while subsequent versions of the selected still image are still being decompressed by the decompression component.

9. A still image display system as recited in claim 4 wherein the non-volatile data storage medium is a CD-ROM.

10. A still image display system as recited in claim 4 wherein the non-volatile data storage medium is a hard disk.

11. A computer comprising:
   a local non-volatile data storage medium;
   a visual display device;
   a selected still image stored as a compressed data file in a multi-resolution compression format on the local non-volatile data storage medium, said multi-resolution format being of a type which allows efficient progressive decompression and display of the selected still image;
   a data processor programmed to decompress the compressed data file; to produce successive versions of the selected still image at progressively increasing resolutions; and to display the successive versions on the visual display device;
   a data retrieval medium through which the data processor retrieves the compressed data file from the local non-volatile data storage medium, the data retrieval medium having a data transfer rate that is at least as fast as the data processor can decompress the compressed data file and display the successive versions of the selected still image;
   wherein the data processor is programmed to execute at least two concurrent execution threads for retrieving the compressed data file from the non-volatile data storage medium and for decompressing the compressed data file, respectively.

12. A computer as recited in claim 11 wherein the compressed data file is compressed in a multi-resolution compression format using a discrete wavelet transform.

13. A computer as recited in claim 11 wherein the data processor is programmed to decompress the data file only after retrieving the entire data file from the local non-volatile data storage medium.

14. A computer as recited in claim 11 wherein the data processor is programmed to execute at least two concurrent execution threads to display versions of the selected still image while decompressing subsequent versions of the selected still image from the compressed data file.

15. A computer as recited in claim 11 wherein the data processor is programmed to decompress the data file only after retrieving the entire data file from the local non-volatile data storage medium and to execute at least two concurrent execution threads to display versions of the selected still image while decompressing subsequent versions of the selected still image from the compressed data file.

16. A computer as recited in claim 11 wherein the local non-volatile data storage medium is a CD-ROM.

17. A computer as recited in claim 11 wherein the local non-volatile data storage medium is a hard disk.

18. A method of storing and displaying a still image comprising the following steps:
   storing a selected still image on a non-volatile data storage medium as a compressed data file;
   retrieving the compressed data file from the non-volatile storage medium at a data transfer rate;
   decompressing the compressed data file to produce successive versions of the selected still image at progressively increasing resolutions at a decompression rate which is as great as the data transfer rate;
   successively displaying the versions of the selected still image on a visual display device;
   wherein the retrieving and decompressing steps are performed concurrently.

19. A method as recited in claim 18 wherein the storing step comprises storing the still image in a multi-resolution compression format which allows efficient progressive decompression and display of the selected still image.

20. A method as recited in claim 18 wherein the storing step comprises storing the still image in a multi-resolution compression format which allows efficient progressive decompression and display of the selected still image, and wherein the retrieving and decompressing steps are performed concurrently.

21. A method as recited in claim 18 and further comprising compressing the selected still image using a discrete wavelet transform.

22. A method as recited in claim 18 wherein the decompressing step is performed only after the retrieving step is completed.

23. A method as recited in claim 18 wherein the displaying and decompressing steps are performed concurrently.

24. A method as recited in claim 18 wherein:
   the decompressing step is performed only after the retrieving step is completed; and
   the displaying and decompressing steps are performed concurrently.

25. A method as recited in claim 18 wherein the storing step comprises storing the selected still image on a CD-ROM.

26. A method as recited in claim 18 wherein the storing step comprises storing the selected still image on a hard disk.

* * * * *